US012261536B2

(12) United States Patent
Chan

(10) Patent No.: US 12,261,536 B2
(45) Date of Patent: Mar. 25, 2025

(54) POWER SUPPLY DEVICE FOR SUPPRESSING NOISE

(71) Applicant: Acer Incorporated, New Taipei (TW)

(72) Inventor: Tzu-Tseng Chan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 220 days.

(21) Appl. No.: 18/182,674

(22) Filed: Mar. 13, 2023

(65) Prior Publication Data

US 2023/0318466 A1 Oct. 5, 2023

(30) Foreign Application Priority Data

Mar. 31, 2022 (TW) ................................ 111112391

(51) Int. Cl.
| | | |
|---|---|---|
| H02M 7/04 | (2006.01) | |
| H02M 1/00 | (2006.01) | |
| H02M 1/42 | (2007.01) | |
| H02M 3/00 | (2006.01) | |
| H02M 3/335 | (2006.01) | |

(52) U.S. Cl.
CPC ....... *H02M 3/33571* (2021.05); *H02M 1/007* (2021.05); *H02M 1/4208* (2013.01); *H02M 3/01* (2021.05); *H02M 3/33553* (2013.01)

(58) Field of Classification Search
CPC ...... H02M 1/007; H02M 1/42; H02M 1/4208; H02M 1/4241; H02M 3/01; H02M 3/335; H02M 3/33553; H02M 3/33571
See application file for complete search history.

(56) References Cited

U.S. PATENT DOCUMENTS

| | | | | |
|---|---|---|---|---|
| 5,625,543 | A | * | 4/1997 | Barrett ................ H02M 1/4208 363/44 |
| 2013/0148384 | A1 | * | 6/2013 | Kim .................... H02M 3/3385 363/21.02 |
| 2016/0352231 | A1 | * | 12/2016 | Quigley .................. H02M 1/36 |
| 2017/0170733 | A1 | * | 6/2017 | Ferencz ............ H02M 3/33571 |
| 2017/0222565 | A1 | * | 8/2017 | Sonobe .................... H02M 3/01 |
| 2023/0136279 | A1 | * | 5/2023 | Kuo ........................ H02M 3/01 363/21.02 |

* cited by examiner

Primary Examiner — Gary L Laxton
(74) Attorney, Agent, or Firm — McClure, Qualey & Rodack, LLP

(57) ABSTRACT

A power supply device for suppressing noise includes a first bridge rectifier, a second bridge rectifier, a coupling inductive element, a first power switch element, a first output stage circuit, a switch circuit, a transformer, a second output stage circuit, and an auxiliary control circuit. The first bridge rectifier and second bridge rectifier generate a first rectified voltage and a second rectified voltage according to a first input voltage and a second input voltage. The coupling inductive element receives the first rectified voltage and the second rectified voltage. The switch circuit generates a control voltage. The second output stage circuit generates an output voltage. The auxiliary control circuit includes a second power switch element. The second power switch element is coupled to the coupling inductive element, and is selectively enabled or disabled according to the control voltage.

15 Claims, 3 Drawing Sheets

POWER SUPPLY DEVICE FOR SUPPRESSING NOISE

CROSS REFERENCE TO RELATED APPLICATIONS

This application claims priority of Taiwan Patent Application No. 111112391 filed on Mar. 31, 2022, the entirety of which is incorporated by reference herein.

BACKGROUND OF THE INVENTION

Field of the Invention

The disclosure generally relates to a power supply device, and more specifically, to a power supply device for suppressing noise.

Description of the Related Art

If the switching frequency of a PFC (Power Factor Corrector) in a conventional power supply device is close to that of the resonant LLC converter, they will tend to generate noise that is easily discernable by the human ear, and this leads to a poor user experience. Accordingly, there is a need to propose a novel solution for solving this problem of the prior art.

BRIEF SUMMARY OF THE INVENTION

In an exemplary embodiment, the invention is directed to a power supply device for suppressing noise. The power supply device includes a first bridge rectifier, a second bridge rectifier, a coupling inductive element, a first power switch element, a first output stage circuit, a switch circuit, a transformer, a resonant capacitor, a second output stage circuit, and an auxiliary control circuit. The first bridge rectifier generates a first rectified voltage according to a first input voltage and a second input voltage. The second bridge rectifier generates a second rectified voltage according to the first input voltage and the second input voltage. The coupling inductive element receives the first rectified voltage and the second rectified voltage. The first power switch element selectively couples the coupling inductive element to a ground voltage according to the clock voltage. The first output stage circuit is coupled to the coupling inductive element, and is configured to generate an internal voltage. The switch circuit receives the internal voltage, and generates a switch voltage and a control voltage. The transformer includes a main coil, a first secondary coil, and a second secondary coil. A leakage inductor and a magnetizing inductor are built in the transformer. The main coil is coupled through the leakage inductor to the switch circuit. The resonant capacitor is coupled to the magnetizing inductor. The second output stage circuit is coupled to the first secondary coil and the second secondary coil, and is configured to generate an output voltage. The auxiliary control circuit generates the clock voltage and includes a second power switch element. The second power switch element is coupled to the coupling inductive element, and is selectively enabled or disabled according to the control voltage.

In some embodiments, if the switching frequency of the switch voltage falls within the range of ±20 kHz of the central frequency of the clock voltage, the second power switch element will be enabled; otherwise, the second power switch element will be disabled.

In some embodiments, the first bridge rectifier includes a first diode, a second diode, a third diode, and a fourth diode. The first diode has an anode coupled to a first input node for receiving the first input voltage, and a cathode coupled to a first node for outputting the first rectified voltage. The second diode has an anode coupled to a second input node for receiving the second input voltage, and a cathode coupled to the first node. Third diode has an anode coupled to the ground voltage, and a cathode coupled to the first input node. The fourth diode has an anode coupled to the ground voltage, and a cathode coupled to the second input node.

In some embodiments, the second bridge rectifier includes a fifth diode, a sixth diode, a seventh diode, and an eighth diode. The fifth diode has an anode coupled to the first input node for receiving the first input voltage, and a cathode coupled to a second node for outputting the second rectified voltage. The sixth diode has an anode coupled to the second input node for receiving the second input voltage, and a cathode coupled to the second node. The seventh diode has an anode coupled to the ground voltage, and a cathode coupled to the first input node. The eighth diode has an anode coupled to the ground voltage, and a cathode coupled to the second input node.

In some embodiments, the coupling inductive element includes a first inductor and a second inductor. The first inductor has a first terminal coupled to the first node for receiving the first rectified voltage, and a second terminal coupled to a third node. The second inductor has a first terminal coupled to the second node for receiving the second rectified voltage, and a second terminal coupled to the third node. The first inductor and the second inductor are mutually coupled with each other.

In some embodiments, the first power switch element includes a first transistor. The first transistor has a control terminal for receiving the clock voltage, a first terminal coupled to the ground voltage, and a second terminal coupled to the third node.

In some embodiments, the first output stage circuit includes a ninth diode and a first capacitor. The ninth diode has an anode coupled to the third node, and a cathode coupled to a fourth node for outputting the internal voltage. The first capacitor has a first terminal coupled to the fourth node, and a second terminal coupled to the ground voltage.

In some embodiments, the switch circuit includes a second transistor, a third transistor, a resistor, and a first controller. The second transistor has a control terminal for receiving the switch voltage, a first terminal coupled to a fifth node, and a second terminal coupled to the fourth node for receiving the internal voltage. The third transistor has a control terminal for receiving an inverted switch voltage, a first terminal coupled to the ground voltage, and a second terminal coupled to the fifth node. The first controller generates the switch voltage and the inverted switch voltage. The first controller further generates the control voltage according to the switch voltage.

In some embodiments, the leakage inductor has a first terminal coupled to the fifth node, and a second terminal coupled to a sixth node. The magnetizing inductor has a first terminal coupled to the sixth node, and a second terminal coupled to a seventh node. The main coil has a first terminal coupled to the sixth node, and a second terminal coupled to the seventh node. The resonant capacitor has a first terminal coupled to the seventh node, and a second terminal coupled to the ground voltage. The first secondary coil has a first terminal coupled to an eighth node, and a second terminal coupled to a common node. The second secondary coil has a first terminal coupled to the common node, and a second terminal coupled to a ninth node.

In some embodiments, the second output stage circuit includes a tenth diode, an eleventh diode, and a second capacitor. The tenth diode has an anode coupled to the eighth node, and a cathode coupled to an output node for outputting the output voltage. The eleventh diode has an anode coupled to the ninth node, and a cathode coupled to the output node. The second capacitor has a first terminal coupled to the output node, and a second terminal coupled to the common node.

In some embodiments, the auxiliary control circuit includes a fourth transistor, a fifth transistor, and a second controller. The fourth transistor forms the second power switch element. The fourth transistor has a control terminal for receiving the clock voltage, a first terminal coupled to a tenth node, and a second terminal coupled to the third node. The fifth transistor has a control terminal for receiving a tuning voltage, a first terminal coupled to the ground voltage, and a second terminal coupled to the tenth node. The second controller generates the clock voltage, and receives the control voltage through the resistor. The second controller further generates the tuning voltage according to the control voltage.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
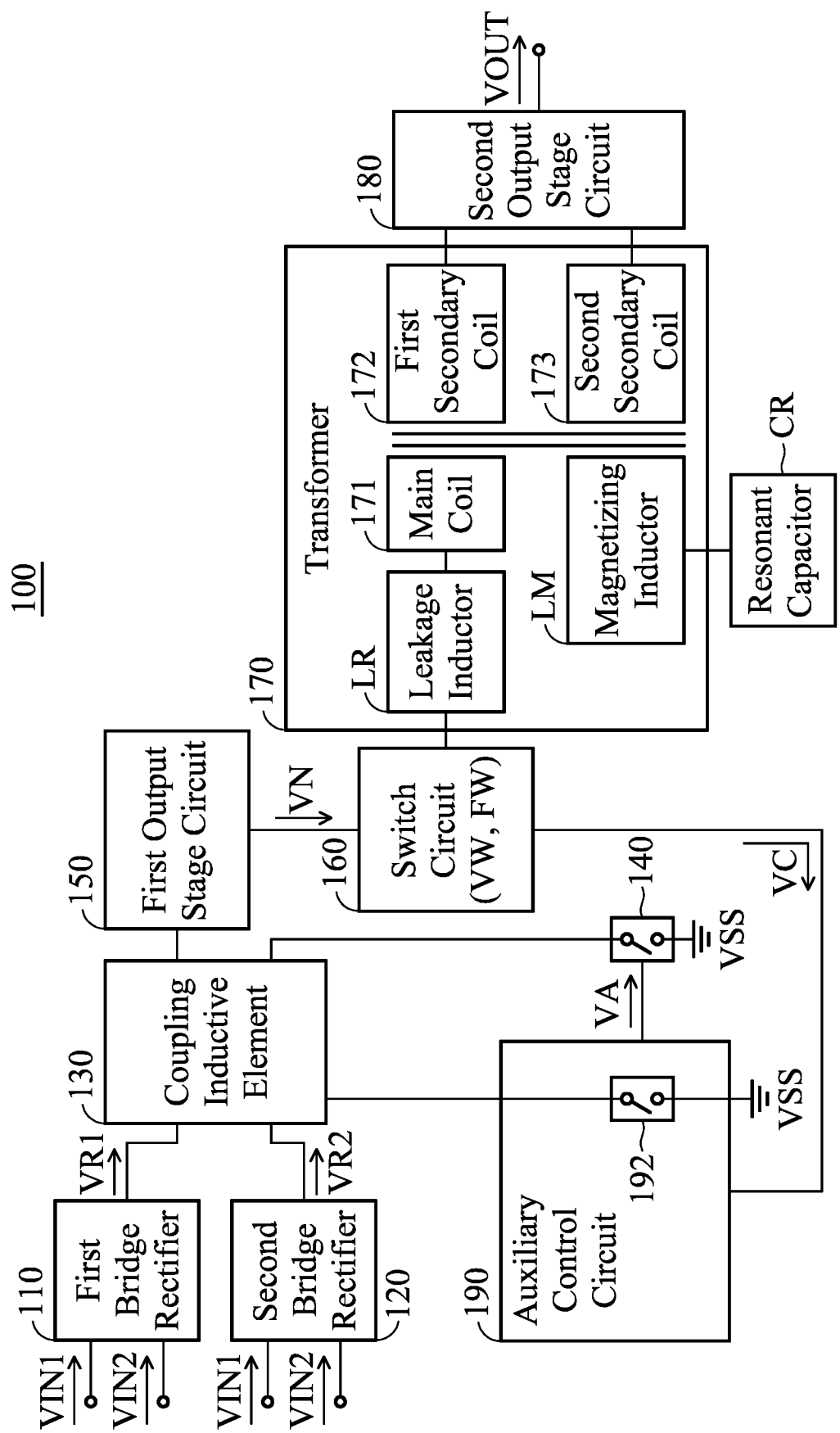
FIG. 1 is a diagram of a power supply device according to an embodiment of the invention.

FIG. 1 is a diagram of a power supply device 100 according to an embodiment of the invention. For example, the power supply device 100 may be applied to a desktop computer, a notebook computer, or an all-in-one computer. As shown in FIG. 1, the power supply device 100 includes a first bridge rectifier 110, a second bridge rectifier 120, a coupling inductive element 130, a first power switch element 140, a first output stage circuit 150, a switch circuit 160, a transformer 170, a resonant capacitor CR, a second output stage circuit 180, and an auxiliary control circuit 190. It should be noted that the power supply device 100 may further include other components, such as a voltage regulator and/or a negative feedback circuit, although they are not displayed in FIG. 1.

The first bridge rectifier 110 generates a first rectified voltage VR1 according to a first input voltage VIN1 and a second input voltage VIN2. The first input voltage VIN1 and the second input voltage VIN2 may be from an external input power source. An AC (Alternating Current) voltage difference with any frequency and any magnitude may be formed between the first input voltage VIN1 and the second input voltage VIN2. For example, the frequency of the AC voltage difference may be about 50 Hz or 60 Hz, and the RMS (Root-Mean-Square) value of the AC voltage difference may be from about 90V to 264V, but they are not limited thereto. The second bridge rectifier 120 generates a second rectified voltage VR2 according to the first input voltage VIN1 and the second input voltage VIN2. The coupling inductive element 130 receives the first rectified voltage VR1 and the second rectified voltage VR2. The first power switch element 140 selectively couples the coupling inductive element 130 to a ground voltage VSS (e.g., 0V) according to the clock voltage VA. For example, if the clock voltage VA has a high logic level (e.g., a logic "1"), the first power switch element 140 may couple the coupling inductive element 130 to the ground voltage VSS (e.g., the first power switch element 140 is similar to a short-circuited path). Conversely, if the clock voltage VA has a low logic level (e.g., a logic "0"), the first power switch element 140 may not couple the coupling inductive element 130 to the ground voltage VSS (e.g., the first power switch element 140 is similar to an open-circuited path). The first output stage circuit 150 is coupled to the coupling inductive element 130, and is configured to generate an internal voltage VN. The internal voltage VN may be considered as a boost voltage. The switch circuit 160 receives the internal voltage VN, and generates a switch voltage VW and a control voltage VC. The transformer 170 includes a main coil 171, a first secondary coil 172, and a second secondary coil 173. A leakage inductor LR and a magnetizing inductor LM are built in the transformer 170. The main coil 171, the leakage inductor LR, and the magnetizing inductor LM may be positioned at the same side of the transformer 170 (e.g., a primary side). The first secondary coil 172 and the second secondary coil 173 may be positioned at the opposite side of the transformer 170 (e.g., a secondary side, which may be isolated from the primary side). The main coil 171 is coupled to the switch circuit 160 through the leakage inductor LR. The resonant capacitor CR is coupled to the magnetizing inductor LM. The second output stage circuit 180 is coupled to the first secondary coil 172 and the second secondary coil 173, and is configured to generate an output voltage VOUT. For example, the output voltage VOUT may be substantially a DC (Direct Current) voltage, whose voltage level may be from 18V to 20V, but it is not limited thereto. The auxiliary control circuit 190 generates the clock voltage VA, and includes a second power switch element 192. The second power switch element 192 is coupled to the coupling inductive element 130, and is selectively enabled or disabled according to the control voltage VC. For example, if the control voltage VC has a high logic level, the second power switch element 192 may be enabled. Conversely, if the control voltage VC has a low logic level, the second power switch element 192 may be disabled. In some embodiments, if the switching frequency FW of the switch voltage VW falls within the range of ±20 kHz of the central frequency FC of the clock voltage VA, the second power switch element 192 will be enabled; otherwise, the second power switch element 192 will be disabled. It should be understood that the aforementioned frequency range is adjustable based on different requirements. According to practical measurements, the design of the invention can effectively suppress the resonant noise generated by the power supply device 100, thereby improving user experiences.

The following embodiments will introduce the detailed structure and operation of the power supply device 100. It should be understood these figures and descriptions are merely exemplary, rather than limitations of the invention.

Figure 2:
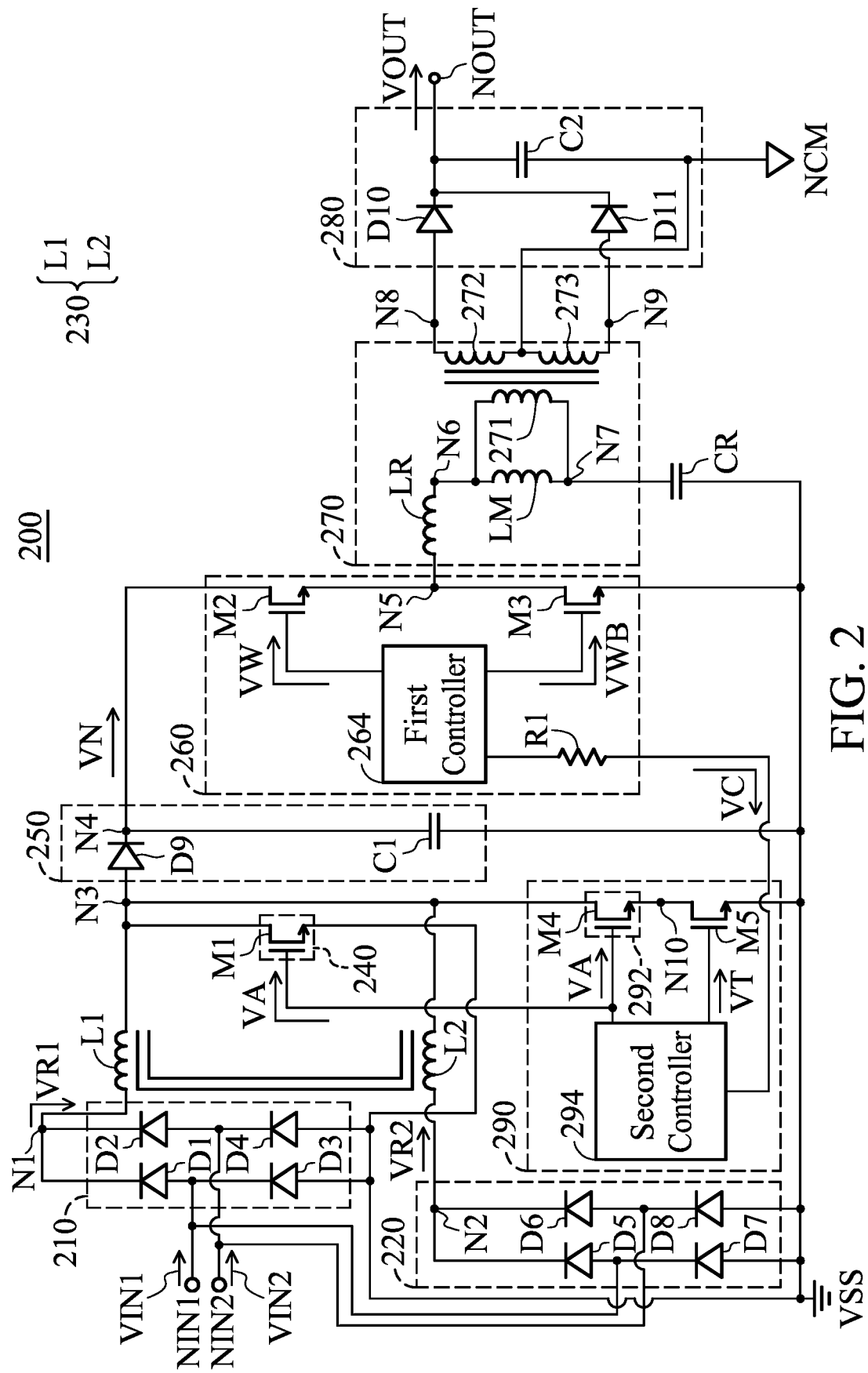
FIG. 2 is a diagram of a power supply device according to an embodiment of the invention.

FIG. 2 is a diagram of a power supply device 200 according to an embodiment of the invention. In the embodiment of FIG. 2, the power supply device 200 with a first input node NIN1, a second input node NIN2 and an output node NOUT includes a first bridge rectifier 210, a second bridge rectifier 220, a coupling inductive element 230, a first power switch element 240, a first output stage circuit 250, a switch circuit 260, a transformer 270, a resonant capacitor CR, a second output stage circuit 280, and an auxiliary control circuit 290. The first input node NIN1 and the second input node NIN2 of the power supply device 200 are arranged for receiving a first input voltage VIN1 and a second input voltage VIN2 from an external input power source, respectively. The output node NOUT of the power supply device 200 is arranged for outputting an output voltage VOUT to an electronic device (not shown).

The first bridge rectifier 210 includes a first diode D1, a second diode D2, a third diode D3, and a fourth diode D4. The first diode D1 has an anode coupled to the first input node NIN1, and a cathode coupled to a first node N1 for outputting a first rectified voltage VR1. The second diode D2 has an anode coupled to the second input node NIN2, and a cathode coupled to the first node N1. The third diode D3 has an anode coupled to a ground voltage VSS, and a cathode coupled to the first input node NIN1. The fourth diode D4 has an anode coupled to the ground voltage VSS, and a cathode coupled to the second input node NIN2.

The second bridge rectifier 220 includes a fifth diode D5, a sixth diode D6, a seventh diode D7, and an eighth diode D8. The fifth diode D5 has an anode coupled to the first input node NIN1, and a cathode coupled to a second node N2 for outputting a second rectified voltage VR2. The sixth diode D6 has an anode coupled to the second input node NIN2, and a cathode coupled to the second node N2. The seventh diode D7 has an anode coupled to the ground voltage VSS, and a cathode coupled to the first input node NIN1. The eighth diode D8 has an anode coupled to the ground voltage VSS, and a cathode coupled to the second input node NIN2.

The coupling inductive element 230 includes a first inductor L1 and a second inductor L2. The first inductor L1 has a first terminal coupled to the first node N1 for receiving the first rectified voltage VR1, and a second terminal coupled to a third node N3. The second inductor L2 has a first terminal coupled to the second node N2 for receiving the second rectified voltage VR2, and a second terminal coupled to the third node N3. The first inductor L1 and the second inductor L2 are mutually coupled with each other. For example, the first inductor L1 and the second inductor L2 may be formed on the same iron core, but they are not limited thereto.

The first power switch element 240 includes a first transistor M1. The first transistor M1 may be an NMOS transistor (N-type Metal Oxide Semiconductor Field Effect Transistor). The first transistor M1 has a control terminal (e.g., a gate) for receiving the clock voltage VA, a first terminal (e.g., a source) coupled to the ground voltage VSS, and a second terminal (e.g., a drain) coupled to the third node N3. For example, the clock voltage VA may be maintained at a constant voltage when the power supply device 200 is initialized. The clock voltage VA may provide a periodical clock waveform after the power supply device 200 is normally operated.

The first output stage circuit 250 includes a ninth diode D9 and a first capacitor C1. The ninth diode D9 has an anode coupled to the third node N3, and a cathode coupled to a fourth node N4 for outputting an internal voltage VN. The first capacitor C1 has a first terminal coupled to the fourth node N4, and a second terminal coupled to the ground voltage VSS.

The switch circuit 260 includes a second transistor M2, a third transistor M3, a resistor R1, and a first controller 264. Each of the second transistor M2 and the third transistor M3 may be an NMOS transistor. The first controller 264 may be implemented with an IC (Integrated Circuit) chip. The second transistor M2 has a control terminal (e.g., a gate) for receiving a switch voltage VW, a first terminal (e.g., a source) coupled to a fifth node N5, and a second terminal (e.g., a drain) coupled to the fourth node N4 for receiving the internal voltage VN. The third transistor M3 has a control terminal (e.g., a gate) for receiving an inverted switch voltage VWB, a first terminal (e.g., a source) coupled to the ground voltage VSS, and a second terminal (e.g., a drain) coupled to the fifth node N5. The first controller 264 generates the switch voltage VW and the inverted switch voltage VWB. The switch voltage VW and the inverted switch voltage VWB may have the same switching frequency FW and complementary logic levels. The first controller 264 further generates a control voltage VC according to the switch voltage VW. For example, the first controller 264 may include a frequency comparator (not shown). In some embodiments, if the switching frequency FW of the switch voltage VW falls within the range of ±20 kHz of the central frequency FC of the clock voltage VA, the control voltage VC will have a high logic level. Conversely, if the switching frequency FW of the switch voltage VW does not fall within the aforementioned range, the control voltage VC will be a low logic level. For example, the central frequency FC of the clock voltage VA may be constant. The first controller 264 may further transmit the control voltage VC through the resistor R1 to the auxiliary control circuit 290.

The transformer 270 includes a main coil 271, a first secondary coil 272, and a second secondary coil 273. A leakage inductor LR and a magnetizing inductor LM are built in the transformer 270. The leakage inductor LR and the magnetizing inductor LM are inherent elements, which are generated when the transformer 270 is manufactured, and they are not external independent elements. The leakage inductor LR, the main coil 271, and the magnetizing inductor LM may be positioned at the same side of the transformer 270. The first secondary coil 272 and the second secondary coil 273 may be positioned at the opposite side of the transformer 270. The leakage inductor LR has a first terminal coupled to the fifth node N5, and a second terminal coupled to a sixth node N6. The magnetizing inductor LM has a first terminal coupled to the sixth node N6, and a second terminal coupled to a seventh node N7. The main coil 271 has a first terminal coupled to the sixth node N6, and a second terminal coupled to the seventh node N7. The resonant capacitor CR has a first terminal coupled to the seventh node N7, and a second terminal coupled to the ground voltage VSS. The first secondary coil 272 has a first terminal coupled to an eighth node N8, and a second terminal coupled to a common node NCM. For example, the common node NCM may be considered as another ground voltage, which may be the same as or different from the aforementioned ground voltage VSS. The second secondary coil 273 has a first terminal coupled to the common node NCM, and a second terminal coupled to a ninth node N9. It should be noted an LLC resonant tank may be formed by the leakage inductor LR, the magnetizing inductor LM, and the resonant capacitor CR.

The second output stage circuit 280 includes a tenth diode D10, an eleventh diode D11, and a second capacitor C2. The tenth diode D10 has an anode coupled to the eighth node N8, and a cathode coupled to the output node NOUT. The eleventh diode D1*l* has an anode coupled to the ninth node N9, and a cathode coupled to the output node NOUT. The second capacitor C2 has a first terminal coupled to the output node NOUT, and a second terminal coupled to the common node NCM.

The auxiliary control circuit 290 includes a fourth transistor M4, a fifth transistor M5, and a second controller 294. Each of the fourth transistor M4 and the fifth transistor M5 may be an NMOS transistor. The second controller 294 may be implemented with another IC chip. The fourth transistor M4 forms a second power switch element 292 of the auxiliary control circuit 290. The fourth transistor M4 has a control terminal (e.g., a gate) for receiving the clock voltage VA, a first terminal (e.g., a source) coupled to a tenth node N10, and a second terminal (e.g., a drain) coupled to the third node N3. The fifth transistor M5 has a control terminal (e.g., a gate) for receiving a tuning voltage VT, a first terminal (e.g., a source) coupled to the ground voltage VSS, and a second terminal (e.g., a drain) coupled to the tenth node N10. The second controller 294 generates the clock voltage VA, and receives the control voltage VC through the resistor R1. The second controller 294 further generates the tuning voltage VT according to the control voltage VC. For example, if the control voltage VC has a high logic level, the second controller 294 may generate the tuning voltage VT with a high logic level for enabling the fifth transistor M5 (also indirectly enabling the fourth transistor M4). Conversely, if the control voltage VC has a low logic level, the second controller 294 may generate the tuning voltage VT with a low logic level for disabling the fifth transistor M5 (also indirectly disabling the fourth transistor M4). In other words, the comparison between the switching frequency FW and the central frequency FC of the clock voltage VA is used to determine whether the fourth transistor M4 and the fifth transistor M5 are enabled.

Figure 3:
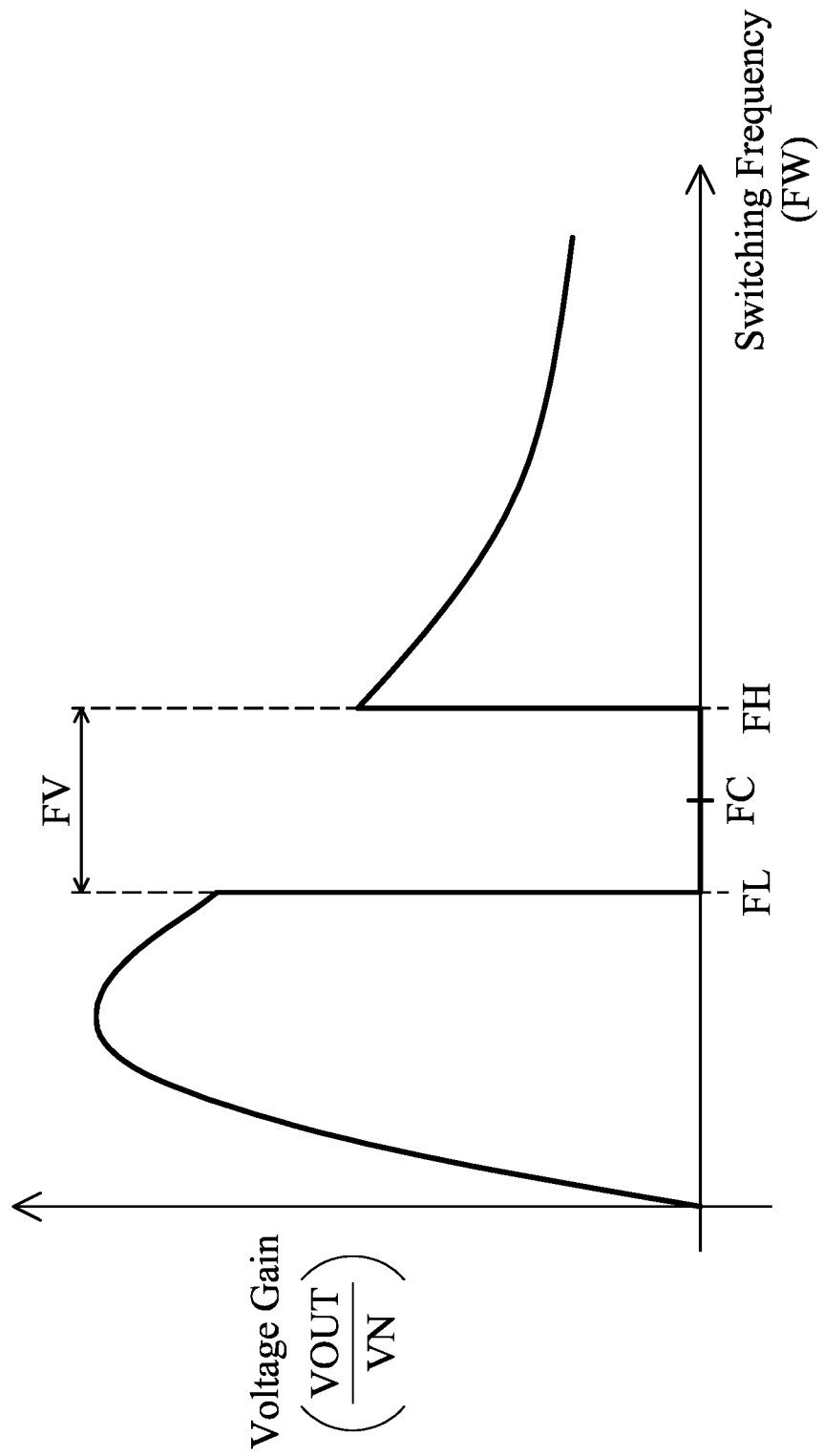
FIG. 3 is a diagram of relationship between voltage gain and a switching frequency of a power supply device according to an embodiment of the invention.

FIG. 3 is a diagram of the relationship between the voltage gain and the switching frequency of the power supply device 200 according to an embodiment of the invention. The horizontal axis represents the switching frequency FW of the switch voltage VW. The vertical axis represents the voltage gain, which may be equal to the ratio of the output voltage VOUT to the internal voltage VN. Generally, an improved PFC (Power Factor Corrector) is formed by the first bridge rectifier 210, the second bridge rectifier 220, the coupling inductive element 230, the first power switch element 240, the first output stage circuit 250, and the auxiliary control circuit 290. In addition, a resonant LLC converter is formed by the switch circuit 260, the transformer 270, the resonant capacitor CR, and the second output stage circuit 280. If the difference between the switching frequency FW of the switch voltage VW and the central frequency FC of the clock voltage VA is between ±10 kHz, a conventional power supply device may generate noise which is detectable by human ears.

To suppress the aforementioned noise, some exemplary embodiments may set a frequency lower bound FL to the central frequency FC minus 20 kHz, and set a frequency upper bound FH to the central frequency FC plus 20 kHz. If the switching frequency FW of the switch voltage VW falls within a frequency interval FV between the frequency lower bound FL and the frequency upper bound FH, the switch circuit 260 and the auxiliary control circuit 290 will enable the second power switch element 292. Conversely, if the switching frequency FW of the switch voltage VW does not fall within the aforementioned frequency interval FV, the switch circuit 260 and the auxiliary control circuit 290 will disable the second power switch element 292. Thus, the second bridge rectifier 220, the second inductor L2, and the second power switch element 292 can form an auxiliary boost circuit, so as to provide additional energy for the resonant LLC converter within the aforementioned frequency interval FV. By reducing the voltage gain within the aforementioned frequency interval FV (e.g., almost decreasing to 0), such a design not only maintains the stable output voltage VOUT, but also effectively eliminates the resonant noise of the power supply device 200, thereby significantly improving the user experiences.

In some embodiments, the element parameters of the power supply device 200 are as follows. The inductance of the first inductor L1 may be from 324 μH to 396 μH, such as about 360 μH. The inductance of the second inductor L2 may be from 324 μH to 396 μH, such as about 360 μH. The inductance of the leakage inductor LR may be from 37.8 μH to 46.2 μH, such as about 42 μH. The inductance of the magnetizing inductor LM may be from 594 μH to 726 μH, such as about 660 μH. The resistance of the resistor R1 may be from 99Ω to 101Ω, such as about 100Ω. The capacitance of the resonant capacitor CR may be from 42.3 nF to 51.7 nF, such as about 47 nF. The capacitance of the first capacitor C1 may be from 1200 ΞF to 1800 μF, such as about 1500 μF. The capacitance of the second capacitor C2 may be from 544 μF to 816 μF, such as about 680 μF. The turn ratio of the main coil 271 to the first secondary coil 272 may be from 1 to 100, such as about 20. The turn ratio of the main coil 271 to the second secondary coil 273 may be from 1 to 100, such as about 20. The central frequency FC of the clock voltage VA may be about 65 kHz. The frequency lower bound FL may be about 45 kHz. The frequency upper bound FH may be about 85 kHz. The frequency interval FV may be from 45 kHz to 85 kHz. The above ranges of parameters are calculated and obtained according to the results of many experiments, and they help to minimize the resonant noise of the power supply device 200.

The invention proposes a novel power supply device, which includes a switch circuit and a corresponding auxiliary control circuit. According to practical measurements, the power supply device using the aforementioned design can effectively its non-ideal noise, and therefore it is suitable for application in a variety of devices.

Note that the above voltages, currents, resistances, inductances, capacitances and other element parameters are not limitations of the invention. A designer can adjust these settings according to different requirements. The power supply device of the invention is not limited to the configurations of FIGS. 1-3. The invention may merely include any one or more features of any one or more embodiments of FIGS. 1-3. In other words, not all of the features displayed in the figures should be implemented in the power supply device of the invention. Although the embodiments of the invention use MOSFET as examples, the invention is not limited thereto, and those skilled in the art may use other types of transistors, such as BJT (Bipolar Junction Transistor), JFET (Junction Gate Field Effect Transistor), FinFET (Fin Field Effect Transistor), etc., without affecting the performance of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A power supply device for reducing noise, comprising:
   a first bridge rectifier, generating a first rectified voltage according to a first input voltage and a second input voltage;
   a second bridge rectifier, generating a second rectified voltage according to the first input voltage and the second input voltage;
   a coupling inductive element, receiving the first rectified voltage and the second rectified voltage;
   a first power switch element, selectively coupling the coupling inductive element to a ground voltage according to a clock voltage;
   a first output stage circuit, coupled to the coupling inductive element, and generating an internal voltage;
   a switch circuit, receiving the internal voltage, and generating a switch voltage and a control voltage;
   a transformer, comprising a main coil, a first secondary coil, and a second secondary coil, wherein a leakage inductor and a magnetizing inductor are built in the transformer, and the main coil is coupled through the leakage inductor to the switch circuit;
   a resonant capacitor, coupled to the magnetizing inductor;
   a second output stage circuit, coupled to the first secondary coil and the second secondary coil, and generating an output voltage; and
   an auxiliary control circuit, generating the clock voltage, and comprising a second power switch element, wherein the second power switch element is coupled to the coupling inductive element, and is selectively enabled or disabled according to the control voltage.

2. The power supply device as claimed in claim 1, wherein if a switching frequency of the switch voltage falls within a range of ±20 kHz of a central frequency of the clock voltage, the second power switch element is enabled; otherwise, the second power switch element is disabled.

3. The power supply device as claimed in claim 1, wherein the first bridge rectifier comprises:
   a first diode, wherein the first diode has an anode coupled to a first input node for receiving the first input voltage, and a cathode coupled to a first node for outputting the first rectified voltage;
   a second diode, wherein the second diode has an anode coupled to a second input node for receiving the second input voltage, and a cathode coupled to the first node;
   a third diode, wherein the third diode has an anode coupled to the ground voltage, and a cathode coupled to the first input node; and
   a fourth diode, wherein the fourth diode has an anode coupled to the ground voltage, and a cathode coupled to the second input node.

4. The power supply device as claimed in claim 3, wherein the second bridge rectifier comprises:
   a fifth diode, wherein the fifth diode has an anode coupled to the first input node for receiving the first input voltage, and a cathode coupled to a second node for outputting the second rectified voltage;
   a sixth diode, wherein the sixth diode has an anode coupled to the second input node for receiving the second input voltage, and a cathode coupled to the second node;
   a seventh diode, wherein the seventh diode has an anode coupled to the ground voltage, and a cathode coupled to the first input node; and
   an eighth diode, wherein the eighth diode has an anode coupled to the ground voltage, and a cathode coupled to the second input node.

5. The power supply device as claimed in claim 4, wherein the coupling inductive element comprises:
   a first inductor, wherein the first inductor has a first terminal coupled to the first node for receiving the first rectified voltage, and a second terminal coupled to a third node; and
   a second inductor, wherein the second inductor has a first terminal coupled to the second node for receiving the second rectified voltage, and a second terminal coupled to the third node;
   wherein the first inductor and the second inductor are mutually coupled with each other.

6. The power supply device as claimed in claim 5, wherein the first power switch element comprises:
   a first transistor, wherein the first transistor has a control terminal for receiving the clock voltage, a first terminal coupled to the ground voltage, and a second terminal coupled to the third node.

7. The power supply device as claimed in claim 6, wherein the first output stage circuit comprises:
   a ninth diode, wherein the ninth diode has an anode coupled to the third node, and a cathode coupled to a fourth node for outputting the internal voltage; and
   a first capacitor, wherein the first capacitor has a first terminal coupled to the fourth node, and a second terminal coupled to the ground voltage.

8. The power supply device as claimed in claim 7, wherein the switch circuit comprises:
   a second transistor, wherein the second transistor has a control terminal for receiving the switch voltage, a first terminal coupled to a fifth node, and a second terminal coupled to the fourth node for receiving the internal voltage; and
   a third transistor, wherein the third transistor has a control terminal for receiving an inverted switch voltage, a first terminal coupled to the ground voltage, and a second terminal coupled to the fifth node.

9. The power supply device as claimed in claim 8, wherein the switch circuit further comprises:
   a resistor; and
   a first controller, generating the switch voltage and the inverted switch voltage, wherein the first controller further generates the control voltage according to the switch voltage.

10. The power supply device as claimed in claim 9, wherein the leakage inductor has a first terminal coupled to the fifth node, and a second terminal coupled to a sixth node, and wherein the magnetizing inductor has a first terminal coupled to the sixth node, and a second terminal coupled to a seventh node.

11. The power supply device as claimed in claim 10, wherein the resonant capacitor has a first terminal coupled to the seventh node, and a second terminal coupled to the ground voltage.

12. The power supply device as claimed in claim 10, wherein the main coil has a first terminal coupled to the sixth node, and a second terminal coupled to the seventh node, wherein the first secondary coil has a first terminal coupled to an eighth node, and a second terminal coupled to a common node, and wherein the second secondary coil has a first terminal coupled to the common node, and a second terminal coupled to a ninth node.

13. The power supply device as claimed in claim 12, wherein the second output stage circuit comprises:
 a tenth diode, wherein the tenth diode has an anode coupled to the eighth node, and a cathode coupled to an output node for outputting the output voltage;
 an eleventh diode, wherein the eleventh diode has an anode coupled to the ninth node, and a cathode coupled to the output node;
 a second capacitor, wherein the second capacitor has a first terminal coupled to the output node, and a second terminal coupled to the common node.

14. The power supply device as claimed in claim 13, wherein the auxiliary control circuit comprises:
 a fourth transistor, forming the second power switch element, wherein the fourth transistor has a control terminal for receiving the clock voltage, a first terminal coupled to a tenth node, and a second terminal coupled to the third node; and
 a fifth transistor, wherein the fifth transistor has a control terminal for receiving a tuning voltage, a first terminal coupled to the ground voltage, and a second terminal coupled to the tenth node.

15. The power supply device as claimed in claim 14, wherein the auxiliary control circuit further comprises:
 a second controller, generating the clock voltage, and receiving the control voltage through the resistor, wherein the second controller further generates the tuning voltage according to the control voltage.

\* \* \* \* \*